(12) United States Patent
Zhu et al.

(10) Patent No.: US 11,354,544 B2
(45) Date of Patent: Jun. 7, 2022

(54) FINGERPRINT IMAGE PROCESSING METHODS AND APPARATUSES

(71) Applicant: ALIPAY (HANGZHOU) INFORMATION TECHNOLOGY CO., LTD., Zhejiang (CN)

(72) Inventors: Kai Zhu, Hangzhou (CN); Jianxu Zheng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,213

(22) Filed: Jun. 29, 2021

(65) Prior Publication Data

US 2022/0012541 A1 Jan. 13, 2022

(30) Foreign Application Priority Data

Jul. 13, 2020 (CN) .......................... 202010670691.1

(51) Int. Cl.
   *G06K 9/62* (2022.01)
   *G06N 20/00* (2019.01)
   (Continued)

(52) U.S. Cl.
   CPC ......... *G06K 9/6262* (2013.01); *G06K 9/6256* (2013.01); *G06N 5/04* (2013.01);
   (Continued)

(58) Field of Classification Search
   CPC ............. G06K 9/6262; G06K 9/00013; G06K 9/00087; G06K 9/6256; G06N 20/00;
   (Continued)

(56) References Cited

U.S. PATENT DOCUMENTS 11,156,998 B2 * 10/2021 Celia ................ G05B 19/41865
2015/0379001 A1 12/2015 Gunningham et al.
(Continued)

FOREIGN PATENT DOCUMENTS

| CN | 107230187 | 10/2017 |
| CN | 107438854 | 12/2017 |

(Continued)

OTHER PUBLICATIONS

Joshi, Indu, et al. "Latent fingerprint enhancement using generative adversarial networks." 2019 IEEE Winter Conference on Applications of Computer Vision (WACV). IEEE, 2019. (Year: 2019).*

(Continued)

*Primary Examiner* — Utpal D Shah
(74) *Attorney, Agent, or Firm* — Fish & Richardson P.C.

(57) ABSTRACT

Methods, systems, and apparatus for operations for processing fingerprint images. An example system includes obtaining an original fingerprint trace image of a fingerprint trace left by a user on a target object; inputting the original fingerprint trace image to a pre-trained fingerprint image processing model that is configured to process the original fingerprint trace image in accordance with pre-trained parameters of the pre-trained fingerprint image processing model; obtaining as output a target fingerprint trace image from the fingerprint image processing model; and using the target fingerprint trace image as a test fingerprint image for performing a test on a fingerprint recognition device, wherein a degree of matching between a fingerprint in the target fingerprint trace image and a real fingerprint that corresponds to a same finger is greater than or equal to a predetermined threshold.

17 Claims, 4 Drawing Sheets

(51) Int. Cl.
    G06V 40/12    (2022.01)
    G06V 40/13    (2022.01)
    G06N 5/04     (2006.01)
    G06T 5/00     (2006.01)
(52) U.S. Cl.
    CPC ............ *G06N 20/00* (2019.01); *G06T 5/001* (2013.01); *G06V 40/13* (2022.01); *G06V 40/1365* (2022.01)
(58) Field of Classification Search
    CPC ...... G06N 5/04; G06T 5/001; G06V 40/1365; G06V 40/13
    See application file for complete search history.

(56) References Cited

U.S. PATENT DOCUMENTS

| | | | | |
|---|---|---|---|---|
| 2020/0184200 | A1* | 6/2020 | Wang | G06K 9/6227 |
| 2021/0019645 | A1* | 1/2021 | Petrey, Jr. | G06N 7/005 |
| 2021/0327028 | A1* | 10/2021 | Machii | G06T 7/11 |

FOREIGN PATENT DOCUMENTS

| | | |
|---|---|---|
| CN | 110415309 | 11/2019 |
| CN | 110929564 | 3/2020 |
| CN | 111461091 | 7/2020 |
| TW | 201814572 | 4/2018 |

OTHER PUBLICATIONS

Zhang, Han, et al. "Self-attention generative adversarial networks." International conference on machine learning. PMLR, 2019. (Year: 2019).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Bontrager et al., "DeepMasterPrints: Generating MasterPrints for Dictionary Attacks via Latent Variable Evolution," Oct. 2018, Computer Vision and Pattern Recognition, 9 pages.

Zhao Xiangxin (ed.), "The relationship between the quality of fingerprint printing and the rate of automatic fingerprint storage," Fingerprint Technology, Jan. 2003, p. 734 (with English machine translation).

Cappelli, "SFinGe: an Approachto Synthetic Fingerprint Generation," Jun. 2012, International Workshop on Biometric Technologies, pp. 147-154, retrieved on Jul. 17, 2015, retrieved from URL<https://math.la.asu.edu/~dieter/courses/Math_Modeling_2013/Cappelli_2004.pdf>.

Extended European Search Report in European Application No. 21180519.7, dated Dec. 1, 2021, 10 pages.

Huang et al., "Latent Fingerprint Image Enhancement Based on Progressive Generative Adversarial Network," Jun. 2020, 2020 IEEE/CVF Conference on Computer Vision and Pattern Recognition Workshops (CVPRW), IEEE, DOI: 10.1109/CVPRW50493.2020.00408, pp. 3481-3489.

Marasco, et al., "Minimizing the Impact of Low Interoperability between Optical Fingerprints Sensors," Sep. 2013, 2013 IEEE Sixth International Conference on Biometrics: Theory, Applications and Systems (BTAS), IEEE, DOI: 10.1109/BTAS.2013.6712733, 8 pages.

Park et al., "Fingerprint Liveness Detection using CNN Features of Random Sample Patches," Sep. 2016, 2016 International Conference of the Biometrics Special Interest Group (BIOSIG), Gesellschaft Fuer Informatik, DOI: 10.1109/BIOSIG.2016.7736923, 4 pages.

Sankaran et al., "Group sparse autoencoder," Jan. 2017, Image and Vision Computing, 60:64-74.

Trace Inspection Experiment Tutorial, 1st ed., Zhong (ed)., Jun. 2016, p. 6 (with machine translation).

* cited by examiner

FINGERPRINT IMAGE PROCESSING METHODS AND APPARATUSES

CROSS-REFERENCE TO RELATED APPLICATIONS

This application claims priority to Chinese Patent Application No. 202010670691.1, filed on Jul. 13, 2020, which is hereby incorporated by reference in its entirety.

TECHNICAL FIELD

The present specification relates to the field of image processing technologies, and in particular, to fingerprint image processing methods and apparatuses.

BACKGROUND

With rapid development of information technologies, fingerprint recognition has been widely applied to various service fields, for example, the payment field, the access control field, and the identity authentication field. Fingerprint recognition is implemented by a fingerprint recognition device. To improve service security of a corresponding service field, a fingerprint attack test needs to be performed on the fingerprint recognition device before the fingerprint recognition device is put into use.

Usually, a large quantity of fingerprints are needed to perform the fingerprint attack test on the fingerprint recognition device. More testers need to be recruited if real fingerprints are used. Consequently, there is a heavy workload and low efficiency. Based on this, a solution needs to be urgently provided, so that fingerprint traces on paper and other products can be used for testing the fingerprint recognition device.

SUMMARY

Embodiments of the present specification provide a fingerprint image processing method. The method includes the following: An original fingerprint trace image of a fingerprint trace left by a user on a target object is obtained; the original fingerprint trace image is input to a pre-trained fingerprint image processing model for processing, and a target fingerprint trace image output from the fingerprint image processing model is obtained; and the target fingerprint trace image is determined as a test fingerprint image for testing a fingerprint recognition device, where the fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Embodiments of the present specification further provide a fingerprint image processing apparatus. The apparatus includes: a first acquisition module, configured to obtain an original fingerprint trace image of a fingerprint trace left by a user on a target object; an execution module, configured to input the original fingerprint trace image to a pre-trained fingerprint image processing model for processing, and obtain a target fingerprint trace image output from the fingerprint image processing model; and a determining module, configured to determine the target fingerprint trace image as a test fingerprint image for testing a fingerprint recognition device, where the fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Embodiments of the present specification further provide a fingerprint image processing device. The device includes a processor; and a memory configured to store a computer-executable instruction. When the executable instruction is executed, the processor is enabled to perform the following operations: obtaining an original fingerprint trace image of a fingerprint trace left by a user on a target object; inputting the original fingerprint trace image to a pre-trained fingerprint image processing model for processing, and obtaining a target fingerprint trace image output from the fingerprint image processing model; and determining the target fingerprint trace image as a test fingerprint image for testing a fingerprint recognition device. The fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Embodiments of the present specification further provide a storage medium, configured to store a computer-executable instruction. When the executable instruction is executed, the following procedures are implemented: obtaining an original fingerprint trace image of a fingerprint trace left by a user on a target object; inputting the original fingerprint trace image to a pre-trained fingerprint image processing model for processing, and obtaining a target fingerprint trace image output from the fingerprint image processing model; and determining the target fingerprint trace image as a test fingerprint image for testing a fingerprint recognition device.

The fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present specification. A person of ordinary skill in the art can further derive other drawings from these accompanying drawings without creative efforts.

DETAILED DESCRIPTION OF EMBODIMENTS

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

The idea of one or more embodiments of the present specification is to train a fingerprint image processing model in advance based on sets of real fingerprint image samples and sets of fingerprint trace image samples corresponding to a plurality of fingers, and then process, by using the fingerprint image processing model, an obtained fingerprint trace image of a fingerprint trace left by a user on an object such as paper, so that a fingerprint in a processed fingerprint trace image is basically the same as a real fingerprint corresponding to the same finger. Therefore, the fingerprint trace image obtained after being processed by the fingerprint image processing model can be used for testing a fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

First, one or more embodiments of the present specification provide a fingerprint image processing method. The method can be applied to a fingerprint image processing device. The fingerprint image processing device can be an intelligent device with an image processing capability, for example, a computer. In other words, the method is performed by the fingerprint image processing device. Specifically, the method can be performed by a fingerprint image processing apparatus installed on the fingerprint image processing device.

Figure 1:
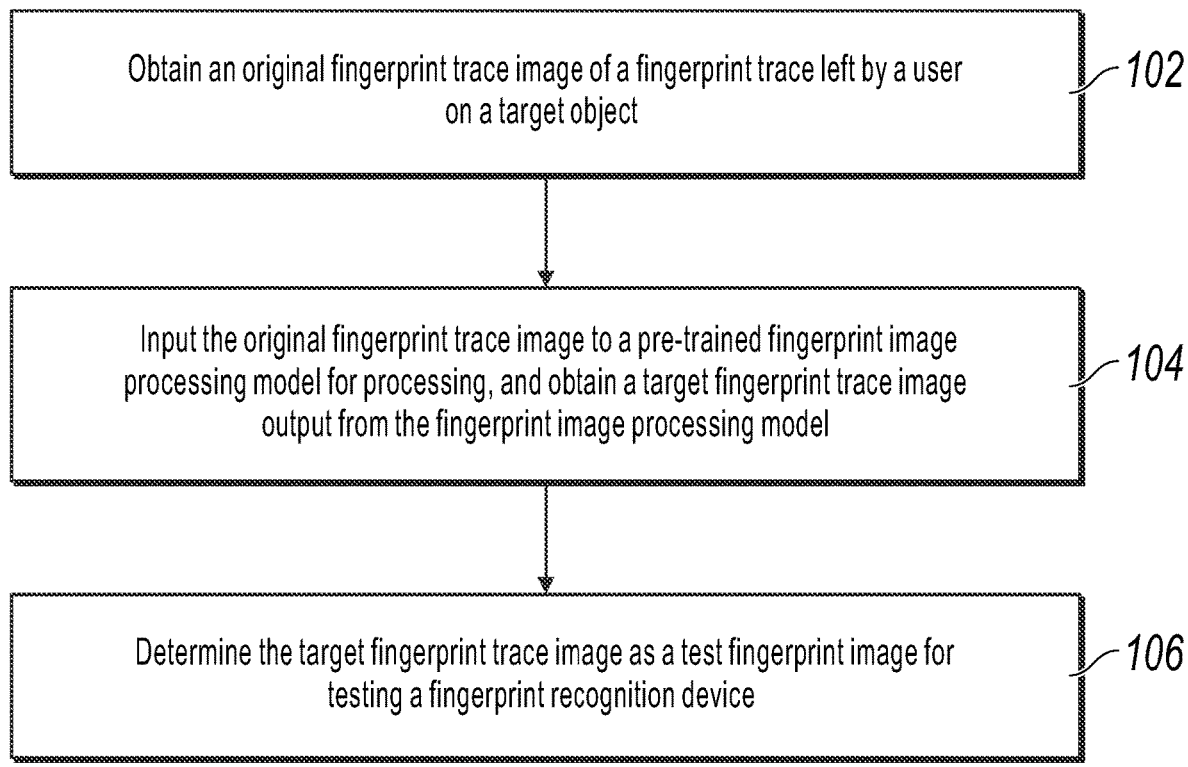
FIG. 1 is a first method flowchart illustrating a fingerprint image processing method, according to embodiments of the present specification.

FIG. 1 is a first method flowchart illustrating a fingerprint image processing method, according to one or more embodiments of the present specification. As shown in FIG. 1, the method includes at least the following steps.

Step 102: Obtain an original fingerprint trace image of a fingerprint trace left by a user on a target object.

The target object can be paper or an object with a smooth surface and on which a fingerprint trace can be easily left, for example, a mobile phone screen, glass, or a plastic product. Specifically, the fingerprint trace left by the user on the target object can be a fingerprint trace left after the user directly touches the target object, can be a fingerprint trace left on the target object through pressing after the user dips the finger into inkpad, etc.

Optionally, in specific implementation, the original fingerprint trace image can be obtained by scanning a region, on the target object, that includes the fingerprint trace of the user by an image scanning device or collecting an image of a region, on the target object, that includes the fingerprint trace of the user by an image collection device.

Therefore, in a specific implementation, in step 102, the obtaining an original fingerprint trace image of a fingerprint trace left by a user on a target object can include: obtaining the original fingerprint trace image from the image scanning device. The original fingerprint trace image is obtained by scanning a fingerprint trace region on the target object by the image scanning device.

The fingerprint trace region can be a region, on the target object, that includes the fingerprint trace left by the user.

Step 104: Input the original fingerprint trace image to a pre-trained fingerprint image processing model for processing, and obtain a target fingerprint trace image output from the fingerprint image processing model.

The fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

The fingerprint sensor for collecting the real fingerprint image of the user can be an optical fingerprint sensor or a capacitive fingerprint sensor, and certainly, can be another type of fingerprint sensor. Here, only two possible specific types of the fingerprint sensor are provided as examples, and constitute no limitation on the one or more embodiments of the present specification.

For example, in a specific implementation, the fingerprint trace included in the original fingerprint trace image is a fingerprint trace of the left thumb of user A, and the degree of matching between the fingerprint in the target fingerprint trace image obtained after being processed by the fingerprint image processing model and a real fingerprint of the left thumb of user A is greater than or equal to the predetermined threshold.

A specific value of the predetermined threshold can be any value such as 95% or 99%. The specific value of the predetermined threshold can be set by a related person based on actual needs. The specific value of the predetermined threshold is not limited in the one or more embodiments of the present specification.

Step 106: Determine the target fingerprint trace image as a test fingerprint image for testing a fingerprint recognition device.

In the embodiments of the present specification, the fingerprint trace of the user in the target fingerprint trace image obtained after being processed by the fingerprint image processing model is already similar to the real fingerprint of the same finger of the user, and therefore the target fingerprint trace image obtained after being processed by the fingerprint image processing model can be used as the test fingerprint image for performing a fingerprint test on the fingerprint recognition device.

According to the fingerprint image processing method provided in the one or more embodiments of the present specification, the fingerprint image processing model is trained in advance based on sets of real fingerprint image samples and sets of fingerprint trace image samples corresponding to a plurality of fingers, and then the obtained fingerprint trace image of the fingerprint trace left by the user on an object such as paper is processed by using the fingerprint image processing model, so that the fingerprint in the processed fingerprint trace image is basically the same as the real fingerprint corresponding to the same finger. Therefore, the fingerprint trace image obtained after being processed by the fingerprint image processing model can be used for testing the fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

Figure 2:
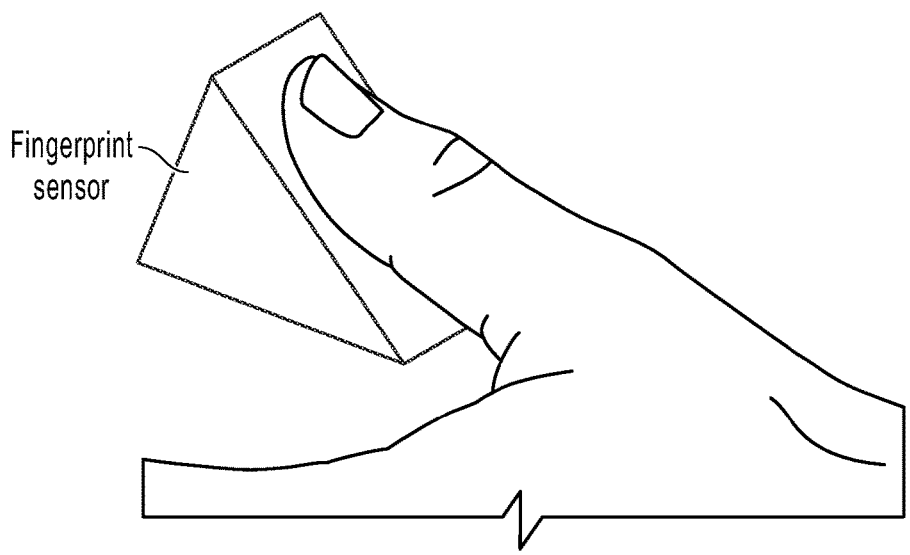
FIG. 2 is a schematic diagram illustrating collecting a real fingerprint image by a fingerprint sensor in a fingerprint image processing method, according to embodiments of the present specification.
Figure 3A:
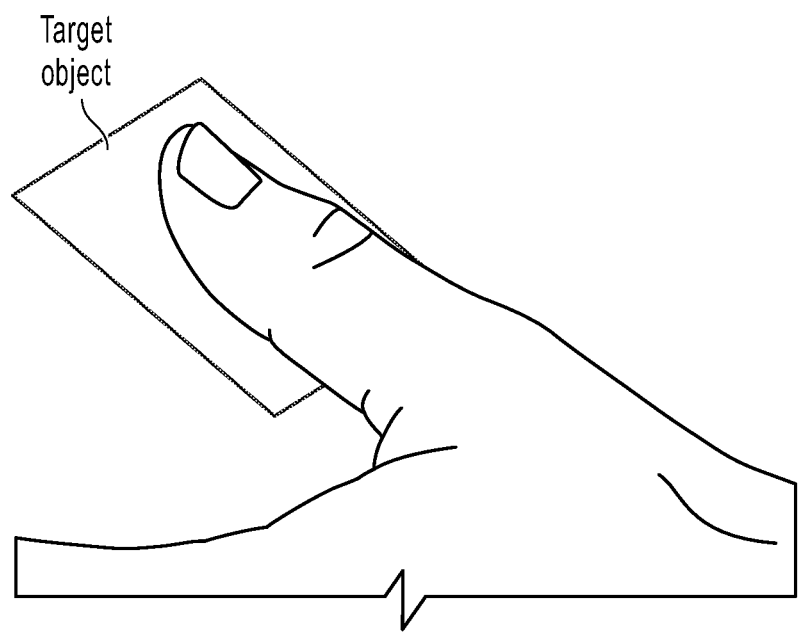
FIG. 3A is a schematic diagram illustrating leaving a fingerprint trace on a target object by a user through pressing in a fingerprint image processing method, according to embodiments of the present specification.
Figure 3B:
FIG. 3B is a schematic diagram illustrating a fingerprint trace left on a target object in a fingerprint image processing method, according to embodiments of the present specification.

Optionally, in a process of collecting the real fingerprint image of the user by the fingerprint sensor, the user can directly press the finger against a fingerprint collection region of the fingerprint sensor. Therefore, a collection direction of the fingerprint sensor is a direction towards the finger, as shown in FIG. 2. However, in a process of collecting, by the image scanning device, the fingerprint trace image of the fingerprint trace left by the user on the target object, it is equivalent to that two processes are performed. In a process of collecting a fingerprint of the user by the target object (pressing the fingerprint against the target object by the user), a collection direction of the target object is actually a direction towards the finger, as shown in FIG. 3A. The fingerprint trace left by the user on the target object is then shown in FIG. 3B. In a process of scanning, by the image scanning device, the fingerprint trace left on the target object, a collection direction is a direction towards the target object. That is, a direction in which the fingerprint trace is scanned is exactly opposite to the direction in which the fingerprint sensor collects the fingerprint. That is, the image scanning device actually scans a mirror fingerprint image of the fingerprint of the user. That is, fingerprints in the real fingerprint image and the fingerprint trace image are mirror fingerprints of each other. Therefore, in a process of training the fingerprint image processing model, the same fingerprint direction needs to be ensured for the set of fingerprint trace image samples and the set of real fingerprint image samples. Therefore, the fingerprint in the fingerprint trace image needs to be mirror-flipped, to obtain a fingerprint trace image sample. Alternatively, the fingerprint in the real fingerprint image is mirror-flipped, to obtain a real fingerprint image sample.

Optionally, in an optional implementation, the obtained fingerprint trace image can be mirror-flipped, and the mirror-flipped fingerprint trace image can be used as the fingerprint trace image sample for training the fingerprint image processing model.

Therefore, in this case, the fingerprint trace in the obtained original fingerprint trace image is also a mirror fingerprint of the real fingerprint of the user. Therefore, in a specific implementation, before step 104 is performed, that is, before the original fingerprint trace image is input to the pre-trained fingerprint image processing model for processing, the method provided in the one or more embodiments of the present specification further includes the following step:

mirror-flipping the original fingerprint trace image.

Accordingly, the inputting the original fingerprint trace image to a pre-trained fingerprint image processing model for processing in step 104 specifically includes:

inputting the mirror-flipped original fingerprint trace image to the fingerprint image processing model; and restoring texture information of a fingerprint trace in the mirror-flipped original fingerprint trace image by using the fingerprint image processing model, and/or adjusting a color value of the fingerprint trace in the mirror-flipped original fingerprint trace image by using the fingerprint image processing model, to reduce a value of color difference between the fingerprint trace in the original fingerprint trace image and the target object.

Specifically, in a process of processing the original fingerprint trace image by using the fingerprint image processing model, only the texture information of the fingerprint trace in the original fingerprint trace image needs to be restored, or only the color value of the fingerprint trace in the original fingerprint trace image needs to be adjusted, or both the texture information of the fingerprint trace in the original fingerprint trace image and the color value of the fingerprint trace in the original fingerprint trace image can be adjusted.

Certainly, in specific implementation, other noises in the original fingerprint trace image can be processed by using the fingerprint image processing model, for example, image ambiguity caused by photographing. The other noises are not limited one by one in the one or more embodiments of the present specification.

Generally, the original fingerprint trace image is a collected image of the fingerprint trace left by the user on the target object, and wet inkpad is used when the user leaves the fingerprint trace on the target object through pressing. Therefore, after the inkpad dries, a fingerprint texture might be incomplete. Alternatively, due to perspiration of the finger, etc., the user can leave a wet fingerprint through pressing. After the fingerprint trace dries, a fingerprint texture might be incomplete. Alternatively, there might be a finger movement, etc. in a process of leaving the fingerprint on the target object by the user through pressing, and consequently the fingerprint trace left on the target object has a blurred texture boundary or a deformed texture. That is, the fingerprint trace in the obtained original fingerprint trace image can be blurred, unclear, incomplete, etc., and differs greatly from the real fingerprint. Therefore, to make the fingerprint trace more similar to the real fingerprint, the texture information of the fingerprint trace needs to be restored. In addition, if the fingerprint trace is an inkpad fingerprint trace, the color value of the fingerprint trace in the original fingerprint trace image differs greatly from that of the target object (for example, paper) because inkpad is usually red, in other words, the fingerprint trace is red, which is not in compliance with a real fingerprint collection scenario. Therefore, a color of the fingerprint in the original fingerprint trace image needs to be adjusted, to reduce a color difference between the fingerprint trace and the target object.

Optionally, in specific implementation, the color value of the fingerprint trace can be reduced in a process of adjusting the color value of the fingerprint trace.

Certainly, in the one or more embodiments of the present specification, the original fingerprint trace image can be mirror-flipped before the original fingerprint trace image is input to the fingerprint image processing model. Alternatively, the original fingerprint trace image can be input to the fingerprint image processing model, and then the original fingerprint trace image can be mirror-flipped by using the fingerprint image processing model.

Therefore, in the one or more embodiments of the present specification, the inputting the original fingerprint trace image to a pre-trained fingerprint image processing model for processing in step 104 specifically includes the following process:

inputting the original fingerprint trace image to the fingerprint image processing model; mirror-flipping the original fingerprint trace image by using the fingerprint image processing model; and restoring texture information of a fingerprint trace in the mirror-flipped original fingerprint trace image, and/or adjusting a color value of the fingerprint trace in the mirror-flipped original fingerprint trace image, to reduce a value of color difference between the fingerprint trace in the original fingerprint trace image and the target object.

In addition, to implement the fingerprint image processing method provided in the one or more embodiments of the present specification, the fingerprint image processing model needs to be trained in advance. Therefore, the fingerprint image processing model needs to be trained before step 104 is performed.

Therefore, in a specific implementation, before step 104 is performed, that is, before the original fingerprint trace image is input to the pre-trained fingerprint image processing model for processing, the method provided in the one or more embodiments of the present specification further includes the following step:

obtaining at least one fingerprint trace image corresponding to a plurality of fingers, and mirror-flipping the fingerprint trace image to generate sets of fingerprint trace image samples corresponding to the plurality of fingers; obtaining sets of real fingerprint image samples corresponding to the plurality of fingers by using the fingerprint sensor; and training the fingerprint image processing model by using sets of fingerprint trace image samples and the sets of real fingerprint image samples corresponding to the plurality of fingers.

It is worthwhile to note that in the one or more embodiments of the present specification, the sets of fingerprint trace image samples corresponding to the plurality of fingers each can include a plurality of fingerprint trace image samples, and the sets of real fingerprint image samples corresponding to the plurality of fingers each can include a plurality of real fingerprint image samples. A quantity of fingerprint trace image samples in the sets of fingerprint trace image samples is the same as a quantity of real fingerprint image samples in the sets of real fingerprint image samples.

In addition, in the one or more embodiments of the present specification, sets of samples of the plurality of fingers of the user need to be obtained to train the fingerprint image processing model.

In a specific implementation, image samples for training the fingerprint image processing model are shown in Table 1.

Finger 1, finger 2, finger 3, and finger 4 in Table 1 can be fingers of the same user or fingers of different users. In addition, Table 1 is merely used for illustrative description by using sets of fingerprint trace image samples and sets of real fingerprint image samples corresponding to four fingers as an example, and constitutes no limitation on the one or more embodiments of the present specification.

TABLE 1

| Finger identifier | Set of fingerprint trace image samples | Set of real fingerprint image samples |
|---|---|---|
| Finger 1 | Set 1 of fingerprint trace image samples | Set 1 of real fingerprint image samples |
| Finger 2 | Set 2 of fingerprint trace image samples | Set 2 of real fingerprint image samples |
| Finger 3 | Set 3 of fingerprint trace image samples | Set 3 of real fingerprint image samples |
| Finger 4 | Set 4 of fingerprint trace image samples | Set 4 of real fingerprint image samples |

In addition, it is worthwhile to note that each set of fingerprint trace image samples includes fingerprint trace image samples of a plurality of fingerprint traces corresponding to the finger, and each set of real fingerprint image samples includes a plurality of real fingerprint image samples corresponding to the finger.

Optionally, in specific implementation, after training of the fingerprint image processing model is completed, a processing effect of the fingerprint image processing model needs to be tested, and the fingerprint image processing model is optimized based on a test result.

Therefore, in the one or more embodiments of the present specification, after training of the fingerprint image processing model is completed, and before the fingerprint trace image is processed by using the fingerprint image processing model, the image processing model further needs to be optimized. That is, before the original fingerprint trace image is input to the pre-trained fingerprint image processing model for processing, the method provided in the one or more embodiments of the present specification further includes the following step:

inputting a fingerprint trace image sample to the fingerprint image processing model for processing; obtaining a processed fingerprint trace image sample output from the fingerprint image processing model, and matching a fingerprint in the processed fingerprint trace image sample with a real fingerprint corresponding to the same finger; and optimizing the fingerprint image processing model based on a matching result.

It is worthwhile to note that the fingerprint trace image sample used for optimizing the fingerprint image processing model can be a newly collected fingerprint trace image sample.

Optionally, in a specific implementation, the matching degree threshold can be predetermined. When the degree of matching between the fingerprint trace in the processed fingerprint trace image sample and the real fingerprint corresponding to the same finger is greater than or equal to the predetermined matching degree threshold, the fingerprint trace in the processed fingerprint trace image sample is considered to match the real fingerprint corresponding to the same finger. Usually, when the degree of matching between the fingerprint trace image sample obtained after being processed by using the fingerprint image processing model and the real fingerprint corresponding to the same finger satisfies the predetermined threshold, the fingerprint image processing model is no longer optimized.

For example, if a value of the predetermined threshold is 97%, it indicates that if 100 fingerprint trace image samples are processed by using the fingerprint image processing model, the fingerprint image processing model is no longer optimized when in the processed fingerprint trace image samples, there are greater than or equal to 97 fingerprint trace image samples that include fingerprint traces that match real fingerprints corresponding to the same finger. Otherwise, the fingerprint image processing model needs to be further optimized.

In addition, it is worthwhile to note that in the one or more embodiments of the present specification, the fingerprint image processing model used can be a self-attention generative adversarial network (SAGAN) model, and certainly, can be other deep learning models. A specific model used for the fingerprint image processing model is not limited in the one or more embodiments of the present specification provided that the model can process the fingerprint texture and/or color of the fingerprint trace image.

In specific implementation, if the fingerprint image processing model used is the SAGAN model, in a model training phase, the sets of real fingerprint image samples and the sets of fingerprint trace image samples corresponding to the plurality of fingers are obtained (the sets of real fingerprint image samples and the sets of fingerprint trace image samples corresponding to the plurality of fingers need to be labeled), and then parameters of the SAGAN model are trained based on the sets of real fingerprint image samples and the sets of fingerprint trace image samples corresponding to the plurality of finger, so that the SAGAN model obtained through training can process the texture and/or color of the fingerprint trace in the fingerprint trace image, to ensure that the fingerprint in the processed fingerprint trace image is basically the same as the real fingerprint of the same finger. In addition, it is worthwhile to note that in the one or more embodiments of the present specification, for the specific process of training the parameters of the SAGAN model based on the sets of real fingerprint image samples and the sets of fingerprint trace image samples corresponding to the plurality of fingers, references can be made to a process of training the SAGAN model in the existing technology. The specific process of training the SAGAN model is omitted here for simplicity.

Optionally, in a specific implementation, after the original fingerprint trace image is input to the SAGAN model, a series of processes such as convolution and pooling are performed on the original fingerprint trace image by the SAGAN model, so that the fingerprint in the target fingerprint trace image output from the SAGAN model is basically the same as the real fingerprint of the same finger. For the specific process of processing the original fingerprint trace image by the SAGAN model, references can be made to a process of processing an image by the SAGAN model in the existing technology. Details are omitted here for simplicity.

Figure 4:
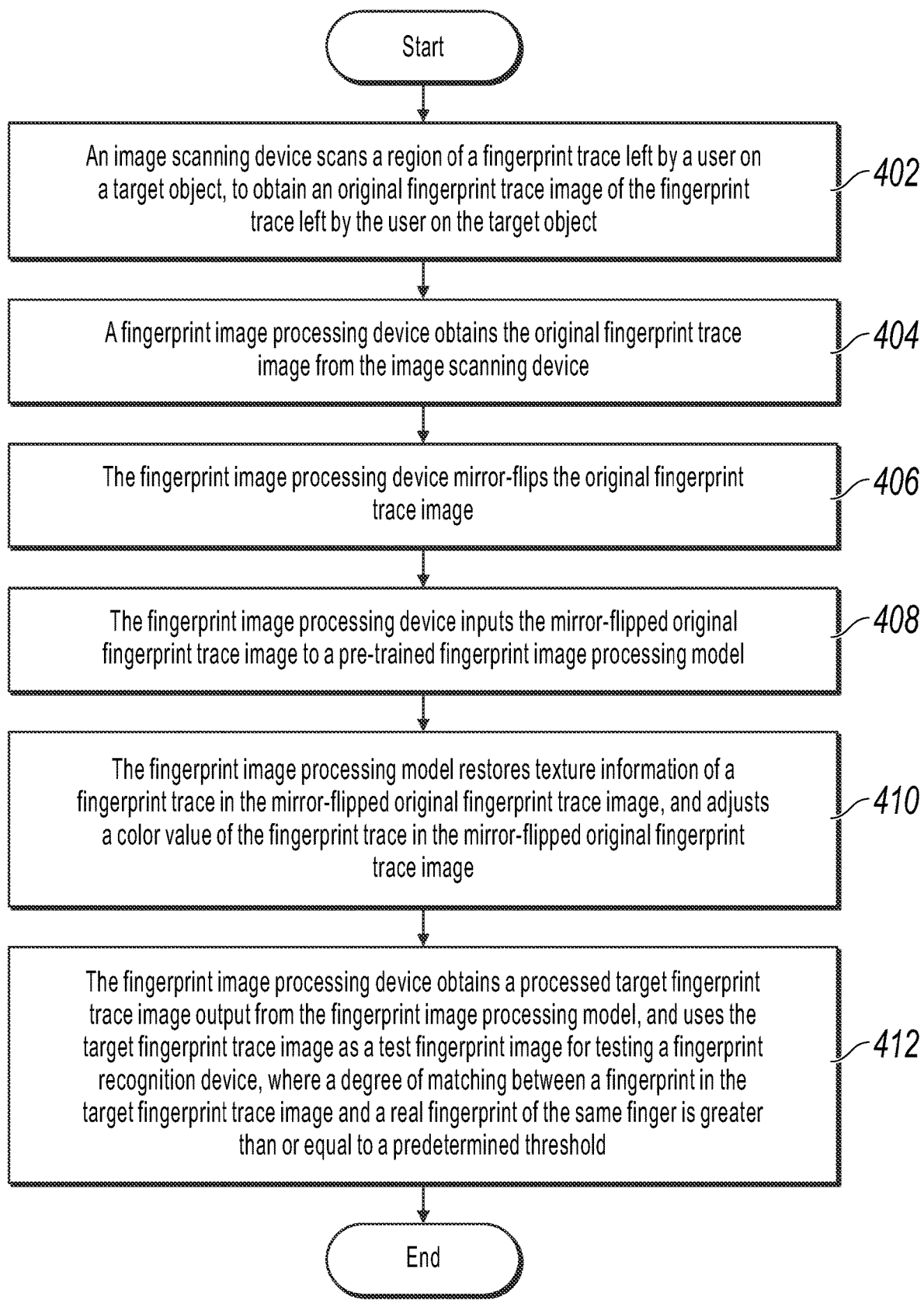
FIG. 4 is a second method flowchart illustrating a fingerprint image processing method, according to embodiments of the present specification.

FIG. 4 is a second method flowchart illustrating a fingerprint image processing method, according to embodiments of the present specification. As shown in FIG. 4, the method includes at least the following steps.

Step 402: An image scanning device scans a region of a fingerprint trace left by a user on a target object, to obtain an original fingerprint trace image of the fingerprint trace left by the user on the target object.

Step 404: A fingerprint image processing device obtains the original fingerprint trace image from the image scanning device.

Step 406: The fingerprint image processing device mirror-flips the original fingerprint trace image.

Step 408: The fingerprint image processing device inputs the mirror-flipped original fingerprint trace image to a pre-trained fingerprint image processing model.

Step 410: The fingerprint image processing model restores texture information of a fingerprint trace in the mirror-flipped original fingerprint trace image, and adjusts a color value of the fingerprint trace in the mirror-flipped original fingerprint trace image.

Step 412: The fingerprint image processing device obtains a processed target fingerprint trace image output from the fingerprint image processing model, and uses the target fingerprint trace image as a test fingerprint image for testing a fingerprint recognition device, where a degree of matching between a fingerprint in the target fingerprint trace image and a real fingerprint of the same finger is greater than or equal to a predetermined threshold.

According to the fingerprint image processing method provided in the one or more embodiments of the present specification, the fingerprint image processing model is trained in advance based on sets of real fingerprint image samples and sets of fingerprint trace image samples corresponding to a plurality of fingers, and then the obtained fingerprint trace image of the fingerprint trace left by the user on an object such as paper is processed by using the fingerprint image processing model, so that the fingerprint in the processed fingerprint trace image is basically the same as the real fingerprint corresponding to the same finger. Therefore, the fingerprint trace image obtained after being processed by the fingerprint image processing model can be used for testing the fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

Figure 5:
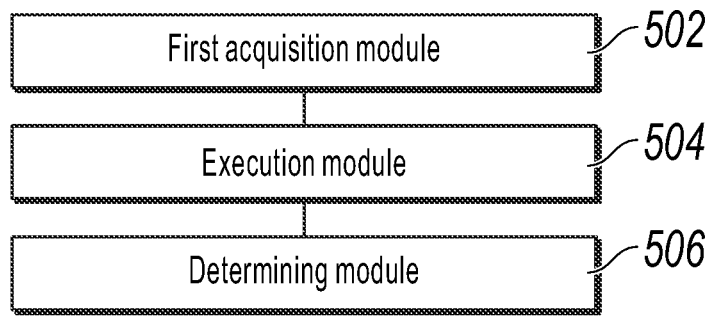
FIG. 5 is a schematic diagram illustrating module composition of a fingerprint image processing apparatus, according to embodiments of the present specification.

Corresponding to the fingerprint image processing methods provided in the embodiments shown in FIG. 1 to FIG. 4 of the present specification, based on the same idea, embodiments of the present specification further provide a fingerprint image processing apparatus for performing the fingerprint image processing method provided in the embodiments shown in FIG. 1 to FIG. 4 of the present specification. FIG. 5 is a schematic diagram illustrating module composition of a fingerprint image processing apparatus, according to embodiments of the present specification. As shown in FIG. 5, the apparatus at least includes:

a first acquisition module 502, configured to obtain an original fingerprint trace image of a fingerprint trace left by a user on a target object;

an execution module 504, configured to input the original fingerprint trace image to a pre-trained fingerprint image processing model for processing, and obtain a target fingerprint trace image output from the fingerprint image processing model; and a determining module 506, configured to determine the target fingerprint trace image as a test fingerprint image for testing a fingerprint recognition device, where the fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Optionally, the apparatus provided in the embodiments of the present specification further includes:

a processing module, configured to mirror-flip the original fingerprint trace image; and correspondingly, the execution module 504 includes:

a first input unit, configured to input the mirror-flipped original fingerprint trace image to the fingerprint image processing model; and a first processing unit, configured to restore texture information of a fingerprint trace in the mirror-flipped original fingerprint trace image by using the fingerprint image processing model, and/or adjust a color value of the fingerprint trace in the mirror-flipped original fingerprint trace image by using the fingerprint image processing model, to reduce a value of color difference between the fingerprint trace in the original fingerprint trace image and the target object.

Optionally, the execution module 504 further includes:

a second input unit, configured to input the original fingerprint trace image to the fingerprint image processing model;

a second processing unit, configured to mirror-flip the original fingerprint trace image by using the fingerprint image processing model; and a third processing unit, configured to restore texture information of a fingerprint trace in the mirror-flipped original fingerprint trace image by using the fingerprint image processing model, and/or adjust a color value of the fingerprint trace in the mirror-flipped original fingerprint trace image, to reduce a value of color difference between the fingerprint trace in the original fingerprint trace image and the target object.

Optionally, the apparatus provided in the embodiments of the present specification further includes:

a generation module, configured to obtain at least one fingerprint trace image corresponding to a plurality of fingers, and mirror-flip the fingerprint trace image to generate sets of fingerprint trace image samples corresponding to the plurality of fingers;

a second acquisition module, configured to obtain sets of real fingerprint image samples corresponding to the plurality of fingers by using the fingerprint sensor; and a training module, configured to train the fingerprint image processing model by using sets of fingerprint trace image samples and the sets of real fingerprint image samples corresponding to the plurality of fingers.

Optionally, the apparatus provided in the embodiments of the present specification further includes:

an input module, configured to input a fingerprint trace image sample to the fingerprint image processing model for processing;

a matching module, configured to obtain a processed fingerprint trace image sample output from the fingerprint image processing model, and match a fingerprint in the processed fingerprint trace image sample with a real fingerprint corresponding to the same finger; and an optimization module, configured to optimize the fingerprint image processing model based on a matching result.

Optionally, the first acquisition module 502 includes:

an acquisition unit, configured to obtain the original fingerprint trace image from an image scanning device, where the original fingerprint trace image is obtained by scanning a fingerprint trace region on the target object by the image scanning device.

The fingerprint image processing apparatus provided in the embodiments of the present specification can further perform the methods performed by the fingerprint image processing apparatus in FIG. 1 to FIG. 4, and implement the functions of the fingerprint image processing apparatus in the embodiments shown in FIG. 1 to FIG. 4. Details are omitted here for simplicity.

According to the fingerprint image processing apparatus provided in the embodiments of the present specification, the fingerprint image processing model is trained in advance based on sets of real fingerprint image samples and sets of fingerprint trace image samples corresponding to a plurality of fingers, and then the obtained fingerprint trace image of the fingerprint trace left by the user on an object such as paper is processed by using the fingerprint image processing model, so that the fingerprint in the processed fingerprint trace image is basically the same as the real fingerprint corresponding to the same finger. Therefore, the fingerprint trace image obtained after being processed by the fingerprint image processing model can be used for testing the fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

Figure 6:
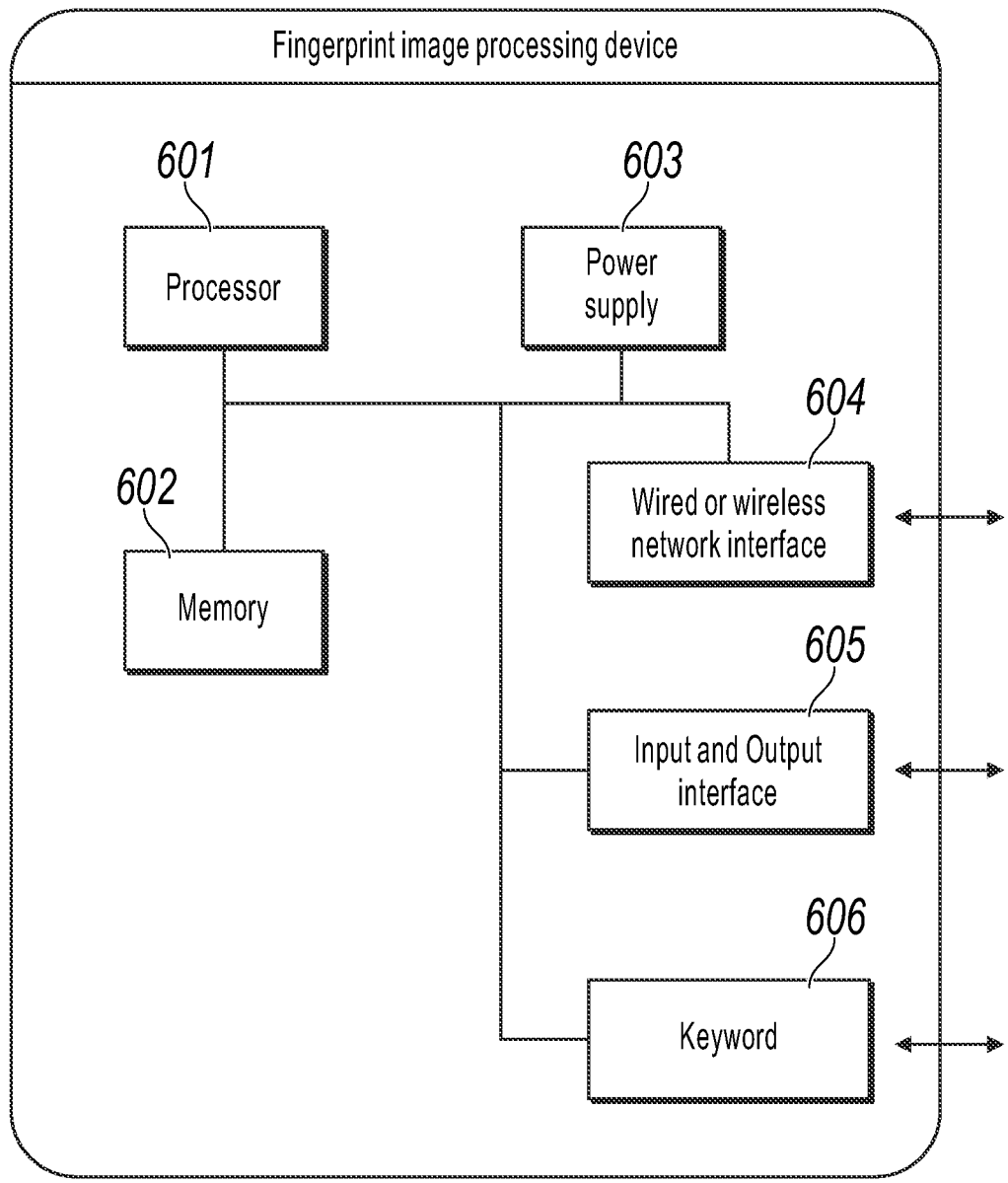
FIG. 6 is a schematic structural diagram illustrating a fingerprint image processing device, according to embodiments of the present specification.

Further, based on the methods shown in FIG. 1 to FIG. 4, embodiments of the present specification further provide a fingerprint image processing device, as shown in FIG. 6.

The fingerprint image processing device can vary with configuration or performance, and can include one or more processors 601 and a memory 602. The memory 602 can store one or more memory application programs or data. The memory 602 can be transient or persistent storage. The application program stored in the memory 602 can include one or more modules (not shown in the figure). Each module can include a series of pieces of computer-executable instruction information for the fingerprint image processing device. Further, the processor 601 can be configured to communicate with the memory 602 to execute the series of pieces of computer-executable instruction information in the memory 602 on the fingerprint image processing device. The fingerprint image processing device can further include one or more power supplies 603, one or more wired or wireless network interfaces 604, one or more input/output interfaces 605, one or more keyboards 606, etc.

In a specific embodiment, the fingerprint image processing device includes a memory and one or more programs. The one or more programs are stored in the memory. The one or more programs can include one or more modules, and each module can include a series of pieces of computer-executable instruction information for the fingerprint image processing device. One or more processors are configured to execute the one or more programs including for use in the following computer-executable instructions:

obtaining an original fingerprint trace image of a fingerprint trace left by a user on a target object;

inputting the original fingerprint trace image to a pre-trained fingerprint image processing model for processing, and obtaining a target fingerprint trace image output from the fingerprint image processing model; and determining the target fingerprint trace image as a test fingerprint image for testing a fingerprint recognition device, where the fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Optionally, when the computer-executable instruction information is executed, before the original fingerprint trace image is input to the pre-trained fingerprint image processing model for processing, the following steps can be further performed:

mirror-flipping the original fingerprint trace image; and the inputting the original fingerprint trace image to a pre-trained fingerprint image processing model for processing includes:

inputting the mirror-flipped original fingerprint trace image to the fingerprint image processing model; and restoring texture information of a fingerprint trace in the mirror-flipped original fingerprint trace image by using the fingerprint image processing model, and/or adjusting a color value of the fingerprint trace in the mirror-flipped original fingerprint trace image by using the fingerprint image processing model, to reduce a value of color difference between the fingerprint trace in the original fingerprint trace image and the target object.

Optionally, when the computer-executable instruction information is executed, the inputting the original fingerprint trace image to a pre-trained fingerprint image processing model for processing includes:

inputting the original fingerprint trace image to the fingerprint image processing model;

mirror-flipping the original fingerprint trace image by using the fingerprint image processing model; and restoring texture information of a fingerprint trace in the mirror-flipped original fingerprint trace image by using the fingerprint image processing model, and/or adjusting a color value of the fingerprint trace in the mirror-flipped original fingerprint trace image, to reduce a value of color difference between the fingerprint trace in the original fingerprint trace image and the target object.

Optionally, when the computer-executable instruction information is executed, before the original fingerprint trace image is input to the pre-trained fingerprint image processing model for processing, the following steps can be further performed:

obtaining at least one fingerprint trace image corresponding to a plurality of fingers, and mirror-flipping the fingerprint trace image to generate sets of fingerprint trace image samples corresponding to the plurality of fingers;

obtaining sets of real fingerprint image samples corresponding to the plurality of fingers by using the fingerprint sensor; and training the fingerprint image processing model by using sets of fingerprint trace image samples and the sets of real fingerprint image samples corresponding to the plurality of fingers.

Optionally, when the computer-executable instruction is executed, before the original fingerprint trace image is input to the pre-trained fingerprint image processing model for processing, the following steps can be further performed:

inputting a fingerprint trace image sample to the fingerprint image processing model for processing;

obtaining a processed fingerprint trace image sample output from the fingerprint image processing model, and matching a fingerprint in the processed fingerprint trace image sample with a real fingerprint corresponding to the same finger; and optimizing the fingerprint image processing model based on a matching result.

Optionally, when the computer-executable instruction information is executed, the obtaining an original fingerprint trace image of a fingerprint trace left by a user on a target object includes:

obtaining the original fingerprint trace image from an image scanning device, where the original fingerprint trace image is obtained by scanning a fingerprint trace region on the target object by the image scanning device.

According to the fingerprint image processing device provided in the embodiments of the present specification, the fingerprint image processing model is trained in advance based on sets of real fingerprint image samples and sets of fingerprint trace image samples corresponding to a plurality of fingers, and then the obtained fingerprint trace image of the fingerprint trace left by the user on an object such as paper is processed by using the fingerprint image processing model, so that the fingerprint in the processed fingerprint trace image is basically the same as the real fingerprint corresponding to the same finger. Therefore, the fingerprint trace image obtained after being processed by the fingerprint image processing model can be used for testing the fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

Further, based on the methods shown in FIG. 1 to FIG. 4, embodiments of the present specification further provide a storage medium configured to store computer-executable instruction information. In a specific embodiment, the storage medium can be a USB flash drive, an optical disc, a hard disk, etc. When the computer-executable instruction information stored in the storage medium is executed by a processor, the following procedures can be implemented:

obtaining an original fingerprint trace image of a fingerprint trace left by a user on a target object;

inputting the original fingerprint trace image to a pre-trained fingerprint image processing model for processing, and obtaining a target fingerprint trace image output from the fingerprint image processing model; and determining the target fingerprint trace image as a test fingerprint image for testing a fingerprint recognition device, where the fingerprint image processing model is obtained through training based on sets of fingerprint trace image samples and sets of real fingerprint image samples corresponding to respective fingers, a real fingerprint image is collected by a fingerprint sensor, and a degree of matching between a fingerprint in the target fingerprint trace image and a real fingerprint corresponding to the same finger is greater than or equal to a predetermined threshold.

Optionally, when the computer-executable instruction information stored in the storage medium is executed by the processor, before the original fingerprint trace image is input to the pre-trained fingerprint image processing model for processing, the following steps can be further performed:

mirror-flipping the original fingerprint trace image; and the inputting the original fingerprint trace image to a pre-trained fingerprint image processing model for processing includes:

inputting the mirror-flipped original fingerprint trace image to the fingerprint image processing model; and restoring texture information of a fingerprint trace in the mirror-flipped original fingerprint trace image by using the fingerprint image processing model, and/or adjusting a color value of the fingerprint trace in the mirror-flipped original fingerprint trace image by using the fingerprint image processing model, to reduce a value of color difference between the fingerprint trace in the original fingerprint trace image and the target object.

Optionally, when the computer-executable instruction information stored in the storage medium is executed by the processor, the inputting the original fingerprint trace image to a pre-trained fingerprint image processing model for processing includes:

inputting the original fingerprint trace image to the fingerprint image processing model;

mirror-flipping the original fingerprint trace image by using the fingerprint image processing model; and restoring texture information of a fingerprint trace in the mirror-flipped original fingerprint trace image by using the fingerprint image processing model, and/or adjusting a color value of the fingerprint trace in the mirror-flipped original fingerprint trace image, to reduce a value of color difference between the fingerprint trace in the original fingerprint trace image and the target object.

Optionally, when the computer-executable instruction information stored in the storage medium is executed by the processor, before the original fingerprint trace image is input to the pre-trained fingerprint image processing model for processing, the following steps can be further performed:

obtaining at least one fingerprint trace image corresponding to a plurality of fingers, and mirror-flipping the fingerprint trace image to generate sets of fingerprint trace image samples corresponding to the plurality of fingers;

obtaining sets of real fingerprint image samples corresponding to the plurality of fingers by using the fingerprint sensor; and training the fingerprint image processing model by using sets of fingerprint trace image samples and the sets of real fingerprint image samples corresponding to the plurality of fingers.

Optionally, when the computer-executable instruction information stored in the storage medium is executed by the processor, before the original fingerprint trace image is input to the pre-trained fingerprint image processing model for processing, the following steps can be further performed:

inputting a fingerprint trace image sample to the fingerprint image processing model for processing;

obtaining a processed fingerprint trace image sample output from the fingerprint image processing model, and matching a fingerprint in the processed fingerprint trace image sample with a real fingerprint corresponding to the same finger; and optimizing the fingerprint image processing model based on a matching result.

Optionally, when the computer-executable instruction information stored in the storage medium is executed by the processor, the obtaining an original fingerprint trace image of a fingerprint trace left by a user on a target object includes:

obtaining the original fingerprint trace image from an image scanning device, where the original fingerprint trace image is obtained by scanning a fingerprint trace region on the target object by the image scanning device.

When the computer-executable instruction information stored in the storage medium provided in the embodiments of the present specification, the fingerprint image processing model is trained in advance based on sets of real fingerprint image samples and sets of fingerprint trace image samples corresponding to a plurality of fingers, and then the obtained fingerprint trace image of the fingerprint trace left by the user on an object such as paper is processed by using the fingerprint image processing model, so that the fingerprint in the processed fingerprint trace image is basically the same as the real fingerprint corresponding to the same finger. Therefore, the fingerprint trace image obtained after being processed by the fingerprint image processing model can be used for testing the fingerprint recognition device. As such, the fingerprint recognition device can be tested without a large quantity of real fingerprints of testers. In this case, there is no need to recruit a large quantity of testers, and therefore a workload of testing the fingerprint recognition device is reduced, and test efficiency is improved.

Specific embodiments of the present specification are described above. Other embodiments fall within the scope of the appended claims. In some cases, the actions or steps described in the claims can be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing can be advantageous.

In the 1990s, whether a technical improvement is a hardware improvement (for example, an improvement on a circuit structure, such as a diode, a transistor, or a switch) or a software improvement (an improvement on a method procedure) can be clearly distinguished. However, as technologies develop, current improvements on many method procedures can be considered as direct improvements on hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, a computer-readable medium that stores computer readable program code (such as software or firmware) that can be executed by a microprocessor or a processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of a logic gate, a switch, an application-specific integrated circuit, a programmable logic controller, and a built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previously described embodiments can be specifically implemented by a computer chip or an entity, or can be implemented by a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, function of units can be implemented in one or more pieces of software and/or hardware.

A person skilled in the art should understand that the embodiment of the present specification can be provided as a method, a system, or a computer program product. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It should be understood that computer program instruction information can be used to implement each process and/or each block in the flowcharts and/or the block diagrams and a combination of processes and/or blocks in the flowcharts and/or the block diagrams. These pieces of computer program instruction information can be provided for a general-purpose computer, a dedicated computer, an embedded processor, or a processor of another programmable data processing device to generate a machine, so that the instruction information executed by the computer or the processor of the another programmable data processing device generates an apparatus for implementing a specific function in one or more processes in the flowcharts and/or in one or more blocks in the block diagrams.

These pieces of computer program instruction information can be stored in a computer-readable memory that can instruct a computer or another programmable data processing device to work in a specific way, so that the instruction information stored in the computer-readable memory generate a product that includes an instruction information apparatus. The instruction information apparatus implements a specific function in one or more processes in the flowcharts and/or in one or more blocks in the block diagrams.

These pieces of computer program instruction information can be loaded onto a computer or another programmable data processing device, so that a series of operations and steps are performed on the computer or the another programmable device, thereby generating computer-implemented processing. Therefore, the instruction information executed on the computer or the another programmable device provides steps for implementing a specific function in one or more processes in the flowcharts and/or in one or more blocks in the block diagrams.

In a typical configuration, a computing device includes one or more processors (CPUs), input/output interfaces, network interfaces, and memories.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer-readable medium includes persistent, non-persistent, removable, and irremovable media that can store information by using any method or technology. The information can be computer-readable instruction information, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, magnetic tape/magnetic disk storage or another magnetic storage device, or any other non-transmission medium. The computer storage medium can be used to store information accessible by a computing device. Based on the definition in the present specification, the computer-readable medium does not include transitory computer readable media (transitory media) such as a modulated data signal and carrier.

It is worthwhile to further note that the term "include", "comprise", or their any other variants are intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

A person skilled in the art should understand that the embodiment of the present specification can be provided as a method, a system, or a computer program product. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

The present specification can be described in the general context of computer-executable instruction information executed by a computer, for example, a program module. The program module usually includes a routine, a program, an object, a component, a data structure, etc. for executing a specific task or implementing a specific abstract data type. The present specification can be practiced in distributed computing environments. In the distributed computing environments, tasks are executed by remote processing devices that are connected through a communications network. In the distributed computing environment, the program module can be located in both local and remote computer storage media including storage devices.

The embodiments of the present specification are described in a progressive way. For same or similar parts in the embodiments, references can be made to these embodiments, and each embodiment focuses on a difference from other embodiments. Particularly, the system embodiment is basically similar to the method embodiments, and therefore is described briefly. For related parts, references can be made to partial description in the method embodiments.

The previous descriptions are merely embodiments of the present specification, and are not intended to limit the present specification. For a person skilled in the art, the present specification can have various modifications and changes. Any modifications, equivalent replacements, and improvements made within the spirit and the principle of the present specification shall fall within the scope of the claims in the present specification.

What is claimed is:

1. A computer-implemented method for processing fingerprint images, comprising:
    obtaining an original fingerprint trace image of a fingerprint trace left by a user on a target object;
    inputting the original fingerprint trace image to a pre-trained fingerprint image processing model that is configured to process the original fingerprint trace image in accordance with pre-trained parameters of the pre-trained fingerprint image processing model;
    obtaining as output a target fingerprint trace image from the fingerprint image processing model; and
    using the target fingerprint trace image as a test fingerprint image for performing a test on a fingerprint recognition device, wherein
    the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;
    wherein inputting the original fingerprint trace image to the pre-trained fingerprint image processing model comprises:
        mirror-flipping the original fingerprint trace image to generate a mirror-flipped fingerprint trace image;
        inputting the mirror-flipped fingerprint trace image to the fingerprint image processing model; and
        restoring texture information of a fingerprint trace in the mirror-flipped fingerprint trace image by using the fingerprint image processing model, or reducing a value of color difference between the fingerprint trace in the original fingerprint trace image and the target object by adjusting a color value of the fingerprint trace in the mirror-flipped fingerprint trace image by using the fingerprint image processing model.

2. A computer-implemented method for processing fingerprint images, comprising:
    obtaining an original fingerprint trace image of a fingerprint trace left by a user on a target object;
    inputting the original fingerprint trace image to a pre-trained fingerprint image processing model that is configured to process the original fingerprint trace image in accordance with pre-trained parameters of the pre-trained fingerprint image processing model;
    obtaining as output a target fingerprint trace image from the fingerprint image processing model; and
    using the target fingerprint trace image as a test fingerprint image for performing a test on a fingerprint recognition device, wherein
    the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;
    wherein inputting the original fingerprint trace image to the pre-trained fingerprint image processing model comprises:
        inputting the original fingerprint trace image to the fingerprint image processing model;
        mirror-flipping the original fingerprint trace image by using the fingerprint image processing model to generate the mirror-flipped fingerprint trace image; and
        restoring texture information of the fingerprint trace in the mirror-flipped fingerprint trace image by using the fingerprint image processing model, or reducing a value of color difference between the fingerprint trace in the original fingerprint trace image and the target object by adjusting a color value of the fingerprint trace in the mirror-flipped fingerprint trace image.

3. A computer-implemented method for processing fingerprint images, comprising:
    obtaining an original fingerprint trace image of a fingerprint trace left by a user on a target object;
    inputting the original fingerprint trace image to a pre-trained fingerprint image processing model that is configured to process the original fingerprint trace image in accordance with pre-trained parameters of the pre-trained fingerprint image processing model;
    obtaining as output a target fingerprint trace image from the fingerprint image processing model; and
    using the target fingerprint trace image as a test fingerprint image for performing a test on a fingerprint recognition device, wherein
    the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;
    wherein before inputting the original fingerprint trace image to the pre-trained fingerprint image processing model, the method further comprises:
        obtaining a plurality of fingerprint trace images corresponding to the plurality of different fingers;

mirror-flipping the plurality of fingerprint trace images to generate the set of fingerprint trace image samples corresponding to the plurality of different fingers;

obtaining the set of real fingerprint image samples corresponding to the plurality of different fingers by using a fingerprint sensor; and training the fingerprint image processing model by using the set of fingerprint trace image samples and the set of real fingerprint image samples corresponding to the plurality of different fingers.

4. The computer-implemented method according to claim 3, wherein before inputting the original fingerprint trace image to the pre-trained fingerprint image processing model, the method further comprises:

inputting a fingerprint trace image sample from the set of fingerprint trace image samples to the fingerprint image processing model for processing;

obtaining as output a processed fingerprint trace image sample from the fingerprint image processing model;

determining a matching result based on matching a fingerprint in the processed fingerprint trace image sample with a real fingerprint that corresponds to a same finger; and optimizing the fingerprint image processing model based on the matching result.

5. The computer-implemented method according to claim 1, wherein obtaining the original fingerprint trace image of the fingerprint trace left by the user on the target object comprises:

scanning a surface region on the target object that has the fingerprint trace by using an image scanning device.

6. The computer-implemented method according to claim 1, wherein the fingerprint image processing model is a self-attention generative adversarial network (SAGAN) model.

7. A non-transitory, computer-readable medium storing one or more instructions executable by a computer system to perform operations for processing fingerprint images, wherein the operations comprise:

obtaining an original fingerprint trace image of a fingerprint trace left by a user on a target object;

inputting the original fingerprint trace image to a pre-trained fingerprint image processing model that is configured to process the original fingerprint trace image in accordance with pre-trained parameters of the pre-trained fingerprint image processing model;

obtaining as output a target fingerprint trace image from the fingerprint image processing model; and using the target fingerprint trace image as a test fingerprint image for performing a test on a fingerprint recognition device, wherein the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;

wherein inputting the original fingerprint trace image to the pre-trained fingerprint image processing model comprises:

mirror-flipping the original fingerprint trace image to generate a mirror-flipped fingerprint trace image;

inputting the mirror-flipped fingerprint trace image to the fingerprint image processing model; and restoring texture information of a fingerprint trace in the mirror-flipped fingerprint trace image by using the fingerprint image processing model, or reducing a value of color difference between the fingerprint trace in the original fingerprint trace image and the target object by adjusting a color value of the fingerprint trace in the mirror-flipped fingerprint trace image by using the fingerprint image processing model.

8. A non-transitory, computer-readable medium storing one or more instructions executable by a computer system to perform operations for processing fingerprint images, wherein the operations comprise:

obtaining an original fingerprint trace image of a fingerprint trace left by a user on a target object;

inputting the original fingerprint trace image to a pre-trained fingerprint image processing model that is configured to process the original fingerprint trace image in accordance with pre-trained parameters of the pre-trained fingerprint image processing model;

obtaining as output a target fingerprint trace image from the fingerprint image processing model; and using the target fingerprint trace image as a test fingerprint image for performing a test on a fingerprint recognition device, wherein the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;

wherein inputting the original fingerprint trace image to the pre-trained fingerprint image processing model comprises:

inputting the original fingerprint trace image to the fingerprint image processing model;

mirror-flipping the original fingerprint trace image by using the fingerprint image processing model to generate the mirror-flipped fingerprint trace image; and restoring texture information of the fingerprint trace in the mirror-flipped fingerprint trace image by using the fingerprint image processing model, or reducing a value of color difference between the fingerprint trace in the original fingerprint trace image and the target object by adjusting a color value of the fingerprint trace in the mirror-flipped fingerprint trace image.

9. A non-transitory, computer-readable medium storing one or more instructions executable by a computer system to perform operations for processing fingerprint images, wherein the operations comprise:

obtaining an original fingerprint trace image of a fingerprint trace left by a user on a target object;

inputting the original fingerprint trace image to a pre-trained fingerprint image processing model that is configured to process the original fingerprint trace image in accordance with pre-trained parameters of the pre-trained fingerprint image processing model;

obtaining as output a target fingerprint trace image from the fingerprint image processing model; and using the target fingerprint trace image as a test fingerprint image for performing a test on a fingerprint recognition device, wherein the fingerprint image processing model is obtained
through training based on a set of fingerprint trace
image samples and a set of real fingerprint image
samples corresponding to a plurality of different fingers, and a degree of matching between a fingerprint in
the target fingerprint trace image and a real fingerprint
that corresponds to a same finger is greater than or
equal to a predetermined threshold;

wherein before inputting the original fingerprint trace
image to the pre-trained fingerprint image processing
model, the operations further comprise:
obtaining a plurality of fingerprint trace images corresponding to the plurality of different fingers;
mirror-flipping the plurality of fingerprint trace images
to generate the set of fingerprint trace image samples
corresponding to the plurality of different fingers;
obtaining the set of real fingerprint image samples
corresponding to the plurality of different fingers by
using a fingerprint sensor; and
training the fingerprint image processing model by
using the set of fingerprint trace image samples and
the set of real fingerprint image samples corresponding to the plurality of different fingers.

10. The non-transitory, computer-readable medium according to claim 9, wherein before inputting the original fingerprint trace image to the pre-trained fingerprint image processing model, the operations further comprise:
inputting a fingerprint trace image sample from the set of
fingerprint trace image samples to the fingerprint image
processing model for processing;
obtaining as output a processed fingerprint trace image
sample from the fingerprint image processing model;
determining a matching result based on matching a fingerprint in the processed fingerprint trace image sample
with a real fingerprint that corresponds to a same finger;
and
optimizing the fingerprint image processing model based
on the matching result.

11. The non-transitory, computer-readable medium according to claim 7, wherein obtaining the original fingerprint trace image of the fingerprint trace left by the user on the target object comprises:
scanning a surface region on the target object that has the
fingerprint trace by using an image scanning device.

12. A computer-implemented system, comprising:
one or more computers; and
one or more computer memory devices interoperably
coupled with the one or more computers and having
tangible, non-transitory, machine-readable media storing one or more instructions that, when executed by the
one or more computers, perform operations for processing fingerprint images, wherein the operations
comprise:
obtaining an original fingerprint trace image of a fingerprint trace left by a user on a target object;
inputting the original fingerprint trace image to a pretrained fingerprint image processing model that is configured to process the original fingerprint trace image in
accordance with pre-trained parameters of the pretrained fingerprint image processing model;
obtaining as output a target fingerprint trace image from
the fingerprint image processing model; and
using the target fingerprint trace image as a test fingerprint
image for performing a test on a fingerprint recognition
device, wherein
the fingerprint image processing model is obtained
through training based on a set of fingerprint trace
image samples and a set of real fingerprint image
samples corresponding to a plurality of different fingers, and a degree of matching between a fingerprint in
the target fingerprint trace image and a real fingerprint
that corresponds to a same finger is greater than or
equal to a predetermined threshold;

wherein inputting the original fingerprint trace image to
the pre-trained fingerprint image processing model
comprises:
mirror-flipping the original fingerprint trace image to
generate a mirror-flipped fingerprint trace image;
inputting the mirror-flipped fingerprint trace image to
the fingerprint image processing model; and
restoring texture information of a fingerprint trace in
the mirror-flipped fingerprint trace image by using
the fingerprint image processing model, or reducing
a value of color difference between the fingerprint
trace in the original fingerprint trace image and the
target object by adjusting a color value of the fingerprint trace in the mirror-flipped fingerprint trace
image by using the fingerprint image processing
model.

13. A computer-implemented system, comprising:
one or more computers; and
one or more computer memory devices interoperably
coupled with the one or more computers and having
tangible, non-transitory, machine-readable media storing one or more instructions that, when executed by the
one or more computers, perform operations for processing fingerprint images, wherein the operations
comprise:
obtaining an original fingerprint trace image of a fingerprint trace left by a user on a target object;
inputting the original fingerprint trace image to a pretrained fingerprint image processing model that is configured to process the original fingerprint trace image in
accordance with pre-trained parameters of the pretrained fingerprint image processing model;
obtaining as output a target fingerprint trace image from
the fingerprint image processing model; and
using the target fingerprint trace image as a test fingerprint
image for performing a test on a fingerprint recognition
device, wherein
the fingerprint image processing model is obtained
through training based on a set of fingerprint trace
image samples and a set of real fingerprint image
samples corresponding to a plurality of different fingers, and a degree of matching between a fingerprint in
the target fingerprint trace image and a real fingerprint
that corresponds to a same finger is greater than or
equal to a predetermined threshold;

wherein inputting the original fingerprint trace image to
the pre-trained fingerprint image processing model
comprises:
inputting the original fingerprint trace image to the
fingerprint image processing model;
mirror-flipping the original fingerprint trace image by
using the fingerprint image processing model to
generate the mirror-flipped fingerprint trace image;
and
restoring texture information of the fingerprint trace in
the mirror-flipped fingerprint trace image by using
the fingerprint image processing model, or reducing
a value of color difference between the fingerprint
trace in the original fingerprint trace image and the target object by adjusting a color value of the fingerprint trace in the mirror-flipped fingerprint trace image.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for processing fingerprint images, wherein the operations comprise:
obtaining an original fingerprint trace image of a fingerprint trace left by a user on a target object;
inputting the original fingerprint trace image to a pre-trained fingerprint image processing model that is configured to process the original fingerprint trace image in accordance with pre-trained parameters of the pre-trained fingerprint image processing model;
obtaining as output a target fingerprint trace image from the fingerprint image processing model; and
using the target fingerprint trace image as a test fingerprint image for performing a test on a fingerprint recognition device, wherein
the fingerprint image processing model is obtained through training based on a set of fingerprint trace image samples and a set of real fingerprint image samples corresponding to a plurality of different fingers, and a degree of matching between a fingerprint in the target fingerprint trace image and a real fingerprint that corresponds to a same finger is greater than or equal to a predetermined threshold;
wherein before inputting the original fingerprint trace image to the pre-trained fingerprint image processing model, the operations further comprise:
obtaining a plurality of fingerprint trace images corresponding to the plurality of different fingers;
mirror-flipping the plurality of fingerprint trace images to generate the set of fingerprint trace image samples corresponding to the plurality of different fingers;
obtaining the set of real fingerprint image samples corresponding to the plurality of different fingers by using a fingerprint sensor; and
training the fingerprint image processing model by using the set of fingerprint trace image samples and the set of real fingerprint image samples corresponding to the plurality of different fingers.

15. The computer-implemented system according to claim 14, wherein before inputting the original fingerprint trace image to the pre-trained fingerprint image processing model, the operations further comprise:
inputting a fingerprint trace image sample from the set of fingerprint trace image samples to the fingerprint image processing model for processing;
obtaining as output a processed fingerprint trace image sample from the fingerprint image processing model;
determining a matching result based on matching a fingerprint in the processed fingerprint trace image sample with a real fingerprint that corresponds to a same finger; and
optimizing the fingerprint image processing model based on the matching result.

16. The computer-implemented system according to claim 12, wherein obtaining the original fingerprint trace image of the fingerprint trace left by the user on the target object comprises:
scanning a surface region on the target object that has the fingerprint trace by using an image scanning device.

17. The computer-implemented system according to claim 12, wherein the fingerprint image processing model is a self-attention generative adversarial network (SAGAN) model.

* * * * *